Figure 1:
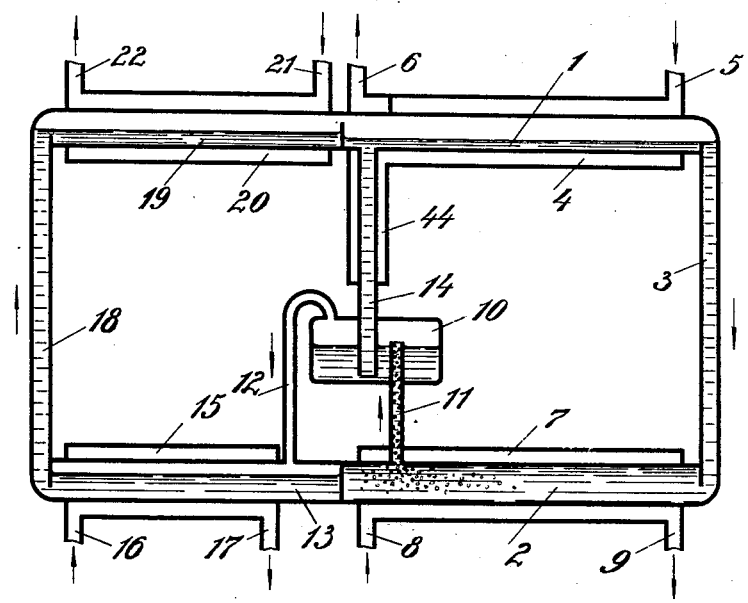

Sept. 17, 1929.  E. ALTENKIRCH  1,728,742
REFRIGERATING APPARATUS OF THE ABSORPTION TYPE Filed June 7, 1923

Inventor
Edmund Altenkirch
by Knight Bros.
Attorneys

Patented Sept. 17, 1929

1,728,742

UNITED STATES PATENT OFFICE

EDMUND ALTENKIRCH, OF FREDERSDORF, NEAR ALT-LANDSBERG, GERMANY, ASSIGNOR TO SIEMENS-SCHUCKERTWERKE GESELLSCHAFT MIT BESCHRÄNKTER HAFTUNG, A GERMAN CORPORATION, DOING BUSINESS AT SIEMENSSTADT, BERLIN, GERMANY

REFRIGERATING APPARATUS OF THE ABSORPTION TYPE

Application filed June 7, 1923, Serial No. 643,943, and in Germany June 16, 1922.

This invention relates to refrigerating apparatus of the absorption type, and more especially to apparatus operating without the aid of a circulating pump or other mechanical conveying means.

It is an object of my invention to provide refrigerating apparatus operated by heat for the expulsion of part of the absorbed gas, in which the gas is utilized for promoting the circulation of liquid between the part of the apparatus termed the absorber and the part of the apparatus termed the boiler, without any such gas being required to be introduced into the absorber.

It is a further object of my invention to provide apparatus of the kind described, all essential parts of which can be made of glass.

In absorption devices of this character, in order to obtain a satisfactory operation, two principal conditions and expedients to meet these conditions are necessary:

First.—The vapor in the boiler must have a higher pressure than the vapor in the absorber; thus means must be provided for maintaining such a pressure difference.

Second.—The working liquid must circulate between the boiler and the absorber; thus means must be provided for maintaining such a circulation.

In U. S. Patent No. 1,455,701 granted to me on May 15th, 1923, I have shown and described with reference to several modified forms, a specific means for maintaining the first-named condition and consisting of a hydrostatic column of liquid.

The object of the present invention is to provide means for maintaining the second-named condition, irrespective and independent of the manner and means by which the first-named condition is maintained. The means by which the present object is carried out consists in utilizing the gas, expelled from the vaporizer or boiler, for assisting the circulation of the working liquid between the boiler and the absorber without thereby introducing any of the gas thus used into the absorber.

According to the invention, a gas separation chamber from which a pipe conveys the gas to the condenser and another pipe conveys the gas-deprived liquid to the absorber, is supplied with a mixture of gas and liquid through an upwardly extending pipe communicating with a conduit leading from the absorber. The effect of the gas bubbles ascending in the said upwardly extending pipe is to circulate the absorption liquid.

In order that the said invention may be clearly understood and readily carried into effect the same will be more fully described with reference to the accompanying drawings, in which:—

Figure 2:
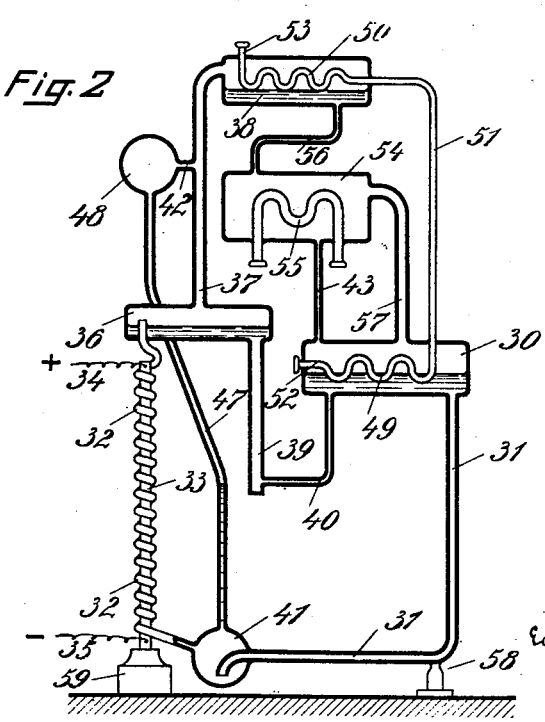

Figure 1 is a section showing one constructional form of apparatus according to the invention, and Figure 2 is a similar view of a modified form of the apparatus.

Though these two figures are substantially similar to Figures 2 and 3 of my aforementioned patent, representing in both instances types of absorption devices preferred over those shown in the prior art, the subject matter of the present invention is not limited in its application to these particular types of devices. It may be used with equal advantage in absorption devices in which the required difference in pressure is maintained by means other than a liquid column, the principal object being at present to avoid a mechanically operated pump implying moving machine elements.

Referring to Figure 1, 1 is the absorber, 2 is the boiler, 3 is a pipe connecting same, 4 is a cooling jacket surrounding the absorber, the cooling water being admitted at 5 and escaping at 6. 7 is a heating jacket surrounding the boiler, steam being admitted at 8 and escaping at 9. 10 is a gas separating chamber arranged above the boiler and 11 is a pipe rising from the boiler and extending into the gas separating chamber 10. 12 is a pipe extending downwards from the top of the chamber 10 and 13 is a condenser which is connected with the chamber 10 by means of pipe 12. 14 is a pipe rising from the gas separating chamber to the absorber 1, pipe 14 extending to near the bottom of the gas separating chamber, while pipe 11 extends somewhat above the level of the liquid in this chamber. 15 is a cooling jacket surrounding the condenser 13, cooling water being admitted at 16 and escaping at 17. 18 is a pipe rising from the condenser, and 19 is the evaporator communicating with the condenser through pipe 18 and surrounded by a cooling jacket 20 having an entrance 21 and an outlet 22 for the cooling medium.

The operation of this device is as follows:—

From the absorber 1 gas-enriched liquid can descend through pipe 3 into the boiler 2; the boiler being heated by the steam circulating through the jacket 7, bubbles of gas, for instance ammonia, are developed in the boiler 2 and in rising in the pipe 11 will exert a lifting effect on the column of liquid in this pipe, thereby causing the liquid to overflow at the top end of the pipe and a column of liquid to be established from the absorber 1 through pipe 3 and boiler 2 to the gas separating chamber 10. The gas expelled from the boiler 2 and rising through pipe 11 will collect in the gas separating chamber above the liquid level therein and will escape through pipe 12 to collect above the liquid level in the condenser 13, while the liquid freed from gas will pass from the gas separating chamber through pipe 14 to the absorber 1. The gas separating chamber is disposed at such a level relative to the absorber that the difference between the pressures in the gas separating chamber 10 and the absorber 1 suffices to overcome the weight and friction of the liquid column in the pipe 14. In this pipe no further development of gas bubbles can occur owing to the provision of a cooling jacket 44, being an extension of the cooling jacket 4 surrounding the absorber 1. The pressure in the gas separating chamber 10 is equal to the pressure in the condenser 13. The boiler 2 being disposed at a lower level than the gas separating chamber 1^, the pressure prevailing in the boiler is higher than the pressure in the condenser 13. In order that the column of liquid in the pipe 3 connecting the absorber 1 and boiler 2 be capable of balancing this excess pressure, it must be correspondingly long. In other words, the difference between the liquid levels in the absorber 1 and in the boiler 2 must be greater than would be required if the gas were passing direct from the boiler 2 into the condenser 13. The liquid in the condenser gradually passes through pipe 18 into the evaporator 19.

The lifting effect exerted on the liquid in the pipe 11 by the gas bubbles rising therein is such that the gas separating chamber 10 can be disposed at a higher level than the absorber 1. In certain cases such an arrangement offers special advantages, as will be explained more fully with reference to the modification illustrated in Figure 2.

In this apparatus a binary liquid, such as sulphuric acid and water is used, and all the parts of the apparatus which come in contact with the liquid, are made of glass. 30 is the absorber and 31 is a pipe leading from the absorber to a spherical vessel 41 which is connected to the boiler having the form of a helically wound glass tube 32 surrounding a heating tube 33 which may consist of asbestos, with electric resistance wires embedded therein, current being supplied to these wires through conductors 34, 35. The glass coil 32 opens into the gas separation chamber 36 which, as shown in the drawing, is arranged at a higher level than the absorber 30. The expelled aqueous vapour passes through a pipe 37 into the condenser 38; the sulphuric acid which has been deprived of the gas returns to the absorber 30 through the pipe 39 and the capillary tube 40. The absorber 30 is cooled by the coiled pipe 49 and the condenser by the coiled pipe 50. The coiled pipes 49 and 50 are connected by a pipe 51 so that the cooling water admitted at 52 can pass through both coiled pipes and escape at 53. In this construction the boiler 32 itself is formed as a rising pipe in which the liquid is conveyed into the gas separation chamber 36 by the lifting action of the gas bubbles rising therein. This arrangement offers the advantage that each bubble on being developed immediately contributes to the upward movement of the liquid in the pipe 32. Moreover the coiled pipe affords an ample heating surface and is comparatively elastic, which is of great importance as when the mixture of sulphuric acid and water is heated the gas or vapor rises in the form of large pistons and sudden gas expulsion takes place which is accompanied by violent shocks. The length and elasticity of the pipe 32 also contribute to keeping the liquid in constant motion, so that the delay in boiling is reduced, and all excessive shocks are avoided. In spite thereof it may happen, more particularly when starting the operation of the apparatus that the first boiling shock which is as a rule a very violent one, will drive the liquid not only into the chamber 36 but also back into the absorber 30. To avoid this, there is inserted between the pipe 31 and the boiler 32 the spherical vessel 41 which communicates by means of a pipe 47 with a gas cushion chamber 48. Inside the vessel 41 the pipe 31 is bent downwards so that any gas that may be forced from the boiler 32 into the vessel 41 cannot get into the pipe 31 but will, on the contrary, rise in the pipe 47 and pass into the chamber 48. The latter is connected to the pipe 37 by a pipe 42 so that the gas passes in that way into the condenser 38.

During operation, the pressure in the gas separation chamber 36 is approximately the same as that in the condenser 38. In order to maintain the pressure always higher than the pressure in the absorber 30, a resistance must be inserted into the pipe connecting the gas separation chamber and the absorber.

Such resistance is constituted by the capillary tube 40. The movement of the liquid through the said capillary tube is however brought about not only by the higher gas pressure in the chamber 36 but also by the higher level which the liquid generally assumes in the gas separation chamber 36 or in the pipe 39. This double pressure action ensures uniform circulation. If for instance the pressure in the condenser 38 and therefore also in the gas separation chamber 36 should for any reason temporarily fall, the static pressure due to the head of liquid in the pipe 39 would still keep up the supply of the liquid to the absorber 30.

The U-shaped tube formed by the pipe 39 and the capillary tube 40 constitutes a liquid seal which prevents aqueous vapour or steam from passing direct into the absorber when, for some reason, the quantity of acid raised into the gas separation chamber is not sufficient. Thus as soon as the level of the liquid in the pipe 39 has sunk sufficiently low, the excess of pressure of the column of liquid in the capillary tube 40 will balance the gas pressure in the gas separation chamber 36. Consequently the liquid will remain stationary and no aqueous vapour will be able to pass into the absorber 30.

Below the condenser 88 is arranged the evaporator 54 in the interior of which a coiled pipe 55 is situated through which flows the medium to be cooled. The condensed aqueous vapour or steam will be forced from the condenser 38 into the evaporator 54 not only by the higher pressure in the condenser but also by the action of the column of liquid due to its higher position. To nevertheless maintain the required difference of pressure the pipe between the condenser and the evaporator has the form of a capillary tube 56. The arrangement of the condenser above the evaporator involves a special advantage. In the modification shown in Figure 1 it is assumed that there is a certain stock of liquid both in the condenser 13 and in the evaporator 19, which is important for ensuring uniformity of working. In many cases however the stock of liquid in the evaporator is only of slight use. If for instance a mixture of water and sulphuric acid is used as the binary mixture, it will be necessary to take into account the fact that small quantities of sulphuric acid will be carried away together with the aqueous vapour or steam. Since in the evaporator 19 the water always evaporates at the surface, and since any traces of sulphuric acid admixed to the water would thus remain, the upper strata of water, near the surface, would gradually become enriched with sulphuric acid. It is true this effect is counteracted by the immediately ensuing diffusion between the two liquids, but the enrichment still exists to a sufficient degree to gradually more and more prevent the evaporation of the water from the surface. The stock of water is therefore of greater value when in the condenser than in the evaporator. In order however to enable the said stock to be utilized under any conditions, it must be conveyed in a reliable manner into the evaporator, even if the pressure in the condenser should temporarily fall. In the modification shown in Figure 1, if there is an insufficient pressure, the stock of water would remain in the condenser 13, and evaporation and therefore further production of cold would be interrupted. If however the condenser is arranged above the evaporator as shown in Figure 2, the water stored in the condenser 38 would in any case pass by gravity in a gradual manner into the evaporator 54 and thus maintain the working of the apparatus for a time even when the required difference of pressure between the two is temporarily non-existent. Any small quantities of sulphuric acid that may pass into the condenser 38, are carried by the water through the capillary tube 56 and thus gradually collect in the evaporator 54. In order to avoid this, a drain tube 43 is provided leading from the bottom of the evaporator 54 into the absorber 30. From the evaporator 54 the aqueous vapour passes through the pipe 57 back into the absorber 30 where it is absorbed by the gas-deprived sulphuric acid and the cycle of operations is started afresh.

The pipe 31 rests on a support 58 and the heating cylinder 33 on a support 59.

The present invention is not limited to its use for refrigeration as the heat generated therein can also be utilized in any desired manner as is known in respect to existing refrigerating apparatus. After the cooling water has passed through the pipe coils 49 and 50 it may not be allowed to escape but its heat may be utilized in any suitable manner. Instead of water any other liquid or a gaseous medium can also be used for being heated and subsequently employed (for example) for heating, saturating, chemical or other purposes by passing it through the pipe coils 49 and 50. The heat which is thus obtained and utilized for useful purposes, is greater than that required for heating the pipe 32. The apparatus shown in Figure 2 then becomes an electric heating apparatus in which the energy represented by heat units delivered is greater than the energy represented by the quantity of electric current consumed those heat units being included which are derived from the medium to be cooled.

In view of the conflicting interpretation of the terminology at the present time, it is to be understood that the term "gas solution", as used in the appended claims, refers to the solution of the gaseous substance in the absorbing medium without any attempt to define its state in that solution, and the term "gas", where it is used in connection with lifting action, refers to a substance in the gaseous phase.

I claim:

1. In refrigerating apparatus of the absorption type the combination of an evaporator, a condenser communicating with the evaporator, an absorber communicating with the evaporator, a gas separation chamber, a pipe connecting said chamber with the absorber, a capillary tube forming part of said pipe, a pipe connecting said chamber with the condenser, a conduit interposed between the absorber and said chamber, a rising pipe forming part of said conduit and opening into said chamber and means for heating said conduit.

2. In refrigerating apparatus of the absorption type, the combination of evaporating means, means to convert a gaseous fluid to a condensed phase, separate gas absorbing means, means allowing the separation of gas and liquid during the operation of said absorbing means, a solution of a gas in a condensed phase, and means operative by lifting action of gas rising in a liquid for conveying such solution from the absorbing means to said separating means.

3. In refrigerating apparatus of the absorption type, the combination of evaporating means, means to convert a gaseous fluid to a condensed phase, separate gas absorbing means, means allowing the separation of gas and liquid during the operation of said absorbing means, a solution of a gas in a condensed phase, gas expelling means, and means relying upon the lifting action of the gas thus expelled for conveying such solution from the absorbing means to said separating means.

4. In refrigerating apparatus of the absorption type, the combination of an absorber, a separate boiler, an absorption solution adapted to circulate between the absorber and boiler incident to the lifting action of gas liberated from said solution by the boiler, condensing means and evaporating means communicating with said condensing means and with said absorber, and means for separating during the operation of said absorbing means the liberated gases from the solution intermediate the boiler and absorber and passing the same to the condensing and evaporating means.

5. In refrigerating apparatus of the absorption type, the combination of an absorber, a circulating system therefor including an ascending conduit, an absorption solution in said system, separate means for expelling gas from said solution in a manner to effect its rise in the said conduit to thereby induce a circulating movement of the solution to the absorber as a result of the buoyancy of the gas, gas separating means arranged for operating simultaneously with said absorber for preventing the liberated gases from passing from the solution to the absorber, and means for condensing and evaporating the separated gases and passing them to the absorber for reabsorption.

6. In refrigerating apparatus of the continuous absorption type the combination of an evaporator, a condenser and an absorber, a communication between said evaporator and said condenser and a communication between said evaporator and said absorber, a gas separating chamber, a communication between said chamber and said absorber and a communication between said chamber and said condenser, another communication between said absorber and said chamber, and means for causing gas bubbles to rise in said last mentioned communication so as to lift liquid into said chamber.

7. In refrigerating apparatus of the continuous absorption type the combination of an evaporator, a condenser and an absorber, a communication between said evaporator and said condenser and a communication between said evaporator and said absorber, a gas separating chamber, a communication between said chamber and said absorber and a communication between said chamber and said condenser, another communication between said absorber and said chamber comprising a rising conduit opening into said chamber, and means for causing gas bubbles to rise in said conduit so as to lift liquid into said chamber.

8. In refrigerating apparatus of the continuous absorption type the combination of an evaporator, a condenser and an absorber, a communication between said evaporator and said condenser and a communication between said evaporator and said absorber, a gas separating chamber, a communication between said chamber and said absorber and a communication between said chamber and said condenser, another communication between said absorber and said chamber, and means for raising the temperature in said other communication.

9. In refrigerating apparatus of the absorption type the combination of an evaporator, a condenser, and an absorber, a communication between said evaporator and said condenser and a communication between said evaporator and said absorber, a gas separating chamber, a communication between said chamber and said absorber and a communication between said chamber and said condenser, another communication between said absorber and said chamber comprising a rising conduit opening into said chamber, and means for raising the temperature in said conduit.

10. In refrigerating apparatus of the continuous absorption type the combination of an evaporator, a condenser and an absorber, a communication between said evaporator and said condenser and a communication between said evaporator and said absorber, a gas separating chamber, means for preventing gas from passing from said chamber to said absorber, a communication between said chamber and said absorber and a communication between said chamber and said condenser, another communication between said absorber and said chamber, and means for causing gas bubbles to rise in said other communication so as to lift liquid into said chamber.

11. In refrigerating apparatus of the continuous absorption type the combination of an evaporator, a condenser and an absorber, a communication between said evaporator and said condenser and a communication between said evaporator and said absorber, a gas separating chamber, means comprising a liquid seal for preventing gas from passing from said chamber to said absorber, a communication between said chamber and said absorber and a communication between said chamber and said condenser, another communication between said absorber and said chamber, and means for causing gas bubbles to rise in said other communication so as to lift liquid into said chamber.

12. In refrigerating apparatus of the continuous absorption type the combination of an evaporator, a condenser and an absorber, a communication between said evaporator and said condenser and a communication between said evaporator and said absorber, a gas separating chamber disposed at a higher level than said absorber, a communication between said chamber and said absorber and a communication between said chamber and said condenser, another communication between said absorber and said chamber, and means for causing gas bubbles to rise in said other communication so as to lift liquid into said chamber.

13. In refrigerating apparatus of the absorption type the combination of an evaporator, a condenser and an absorber, a communication between said evaporator and said condenser comprising a capillary tube, a gas separating chamber, communication between said chamber and said condenser, another communication between said absorber and said chamber and means for raising the temperature in said other communication.

14. In refrigerating apparatus of the absorption type the combination of an evaporator, a condenser communicating with said evaporator, an absorber, two pipes, one of them a drain pipe, connecting said absorber with said evaporator, a gas separating chamber, a communication between said chamber and said absorber and condenser, another communication between said absorber and said chamber, and means for causing gas bubbles to rise in said other communication so as to lift liquid into said chamber.

15. Refrigerating apparatus of the continuous absorption type comprising a glass evaporator.

16. Refrigerating apparatus of the continuous absorption type comprising a glass evaporator, condenser and absorber.

17. Refrigerating apparatus of the continuous absorption type, all the essential parts of which are made of glass.

18. In refrigerating apparatus of the absorption type comprising a boiler, a separate absorber, and a liquid circulation between said boiler and said absorber brought about by the lifting action of gas.

19. In refrigerating apparatus of the absorption type comprising a boiler, a separate absorber, and a liquid circulation between said boiler and said absorber brought about by the lifting action of gas rising in said liquid.

20. In refrigerating apparatus of the absorption type comprising a boiler, a separate absorber, and a liquid circulation between said boiler and said absorber brought about by means of gas pistons rising in and conveying liquid between said boiler and said absorber.

21. Refrigerating apparatus of the continuous absorption type comprising an absorber and a boiler connected to afford a circulation of absorption liquid, said circulation including a rising column and being aided by the lifting action of gas moving in said column, and gas conveying means leading from said column to receive the gas after performing its lifting function.

In testimony whereof I affix my signature.

EDMUND ALTENKIRCH.